United States Patent [19]

Komiyama et al.

[11] Patent Number: 4,742,417
[45] Date of Patent: May 3, 1988

[54] MAGNETIC TAPE CASSETTE WITH SNAP COUPLED U-SHAPED SLIDE GUARD

[75] Inventors: Choji Komiyama; Kengo Oishi, both of Kanagawa, Japan

[73] Assignee: Fuji Photo Film Co., Ltd., Kanagawa, Japan

[21] Appl. No.: 769,649

[22] Filed: Aug. 27, 1985

[30] Foreign Application Priority Data

Aug. 27, 1984 [JP] Japan .................. 59-128638[U]

[51] Int. Cl.$^4$ .................................. G11B 23/02
[52] U.S. Cl. ........................ 360/132; 242/198
[58] Field of Search .............. 360/132; 242/197, 198, 242/199

[56] References Cited

U.S. PATENT DOCUMENTS

| | | | |
|---|---|---|---|
| 3,259,331 | 7/1966 | Liddle | 242/198 |
| 3,796,394 | 3/1974 | Souza | 360/132 X |
| 4,516,181 | 5/1985 | Shirako | 360/132 |
| 4,541,581 | 9/1985 | Hara | 242/198 |
| 4,572,461 | 2/1986 | Horikawa et al. | 360/132 X |
| 4,576,345 | 3/1986 | Koken et al. | 242/198 |
| 4,620,254 | 10/1986 | Smith, II | 360/93 X |
| 4,625,253 | 11/1986 | Kawakawi et al. | 360/132 |
| 4,676,453 | 6/1987 | Komiyama et al. | 242/199 |

FOREIGN PATENT DOCUMENTS

| | | | |
|---|---|---|---|
| 0144802 | 6/1985 | European Pat. Off. | 360/96.1 |
| 0147172 | 9/1982 | Japan | 360/132 |
| 0128068 | 7/1983 | Japan | 360/132 |

Primary Examiner—John H. Wolff
Assistant Examiner—Andrew L. Sniezek
Attorney, Agent, or Firm—Sughrue, Mion, Zinn, Macpeak & Seas

[57] ABSTRACT

A magnetic tape cassette particularly well adapted for use with digital audio magnetic tapes, which is small in size and easy to assemble. The cassette includes upper and lower half cases and a slide guard for covering a lower part of an opening through which the magnetic tape is extracted for recording and reproduction. The slide guard is in the form of a substantially U-shaped plate member having side pieces at its opposite ends which extend along side walls of the cassette. The slide guard is urged towards the front end of the cassette and is slidably mounted so as to be slidable forwardly and backwardly of the cassette. Overhangs are formed on upper edges of the side pieces of the slide guard confronting each other and which are received in the cassette through slits formed in the side walls of the cassette. Upper edges of the overhangs have the form of tapered surfaces inclined inwardly of the slide guard. The distance between the upper ends of the tapered surfaces is larger than the distance between the right and left parts of the lower half case on which the slide guard is mounted requiring flexing of the slide guard side pieces during mounting of the lower half case.

2 Claims, 2 Drawing Sheets

MAGNETIC TAPE CASSETTE WITH SNAP COUPLED U-SHAPED SLIDE GUARD

This application relates to U.S. application, Ser. No. 780,759, filed Sept. 27, 1985 and assigned to the common assignee.

BACKGROUND OF THE INVENTION

The present invention relates to audio magnetic tape cassettes, and more particularly, to a compact cassette the same as or smaller in size than a standard "Phillips" type compact cassette.

Recently, cassette tape recorders have been reduced in size and in weight, and accordingly magnetic tape cassettes have been also miniaturized. Therefore, there has been a strong demand for the provision of small magnetic tape cassettes which are suitable for high-quality and high-density recording and reproducing operations. For instance, the magnetic tape cassette should be suitable for use in digital recording such as with PCM (pulse code modulation) whereby recording and reproducing operations are carried out with input signals converted into pulse signals. In such a system, the recording frequency bandwidth must be about five times as wide as the maximum bandwidth of a conventional audio tape intended for analog recording. Therefore, video tape cassettes, which are considerably larger in size than audio compact cassettes, have been extensively employed for such purposes.

Video tape cassettes (except for special cases) are intended for use with a rotary head system. These video tape cassettes have guard panels which close openings formed in the front parts of the cassettes and are swingable upwardly for recording and playing back. That is, in video and digital systems, because the recording and reproducing operations are carried out using higher recording densities and wider bandwidths than is possible with a conventional audio compact cassette, and because the tape is therefore more sensitive to contamination, it is necessary to more positively prevent the entrance of dust and the like into the cassette to protect the magnetic tape from damage.

The technical concept of the invention is applied to a very small magnetic tape cassette which, similarly to the above-described video tape cassette, employs a relatively wide frequency bandwidth recording and reproducing system, and which is applicable to audio devices, and is the same as or smaller in size than the conventional audio compact cassette. Specifically, so that the cassette can be used outdoors and carried without a storage casing, the magnetic tape cassette must have better dust protection than a conventional video tape cassette.

A variety of digital audio tape magnetic tape cassettes have been proposed. Such magnetic tape cassettes generally include a guard panel which is swung upwardly, similarly to the above-described video tape cassette, and a slide guard which is slid along the bottom of the cassette in a direction perpendicular to the longitudinal direction of the cassette, thereby to close the lower part of an opening formed in the front part of the cassette which receives the tape drawing mechanism of the magnetic tape recording and reproducing device. However, a magnetic tape cassette having such a guard panel and slide guard suffers from the difficulties that it is difficult to assemble because it is intricate in construction and small in size.

SUMMARY OF THE INVENTION

An object of the invention is thus to eliminate the above-described difficulties. More specifically, an object of the invention is to provide a digital audio magnetic tape cassette which is small in size but easy to assemble.

The foregoing object and other objects of the invention have been achieved by the provision of a magnetic tape cassette which incorporates a pair of hubs on which a magnetic tape is wound, and which has an opening through which the magnetic tape can be pulled out of the cassette, a guard panel for covering the front part of the opening, a slide guard for covering the lower part of the opening, a locking member for locking the hubs, friction sheets, and upper and lower half cases, in which, according to the invention, the guard panel is substantially U shaped in horizontal section, pivotally mounted on the front parts of the side walls of the cassette so that it is swingable upwardly, and is urged to close the opening, the slide guard is a plate member which is substantially U shaped in vertical section and has side pieces at both ends which extend along the side walls of the cassette, the slide guard being urged towards the front end of the cassette so that the slide guard can be slid forwardly and backwardly of the cassette, upper surfaces of overhangs formed along the upper edges of the side pieces of the slide guard confronting each other and extending into the cassette through slits formed in the side walls of the cassette being formed as tapered surfaces which are inclined inwardly of the slide guard, and the distance between the upper ends of the tapered surfaces being larger than the distance between the right and left parts of the lower half case on which the slide guard is mounted.

DESCRIPTION OF THE PREFERRED EMBODIMENTS

The invention will now be described in detail with reference to preferred embodiments shown in the accompanying drawings.

Figure 1:
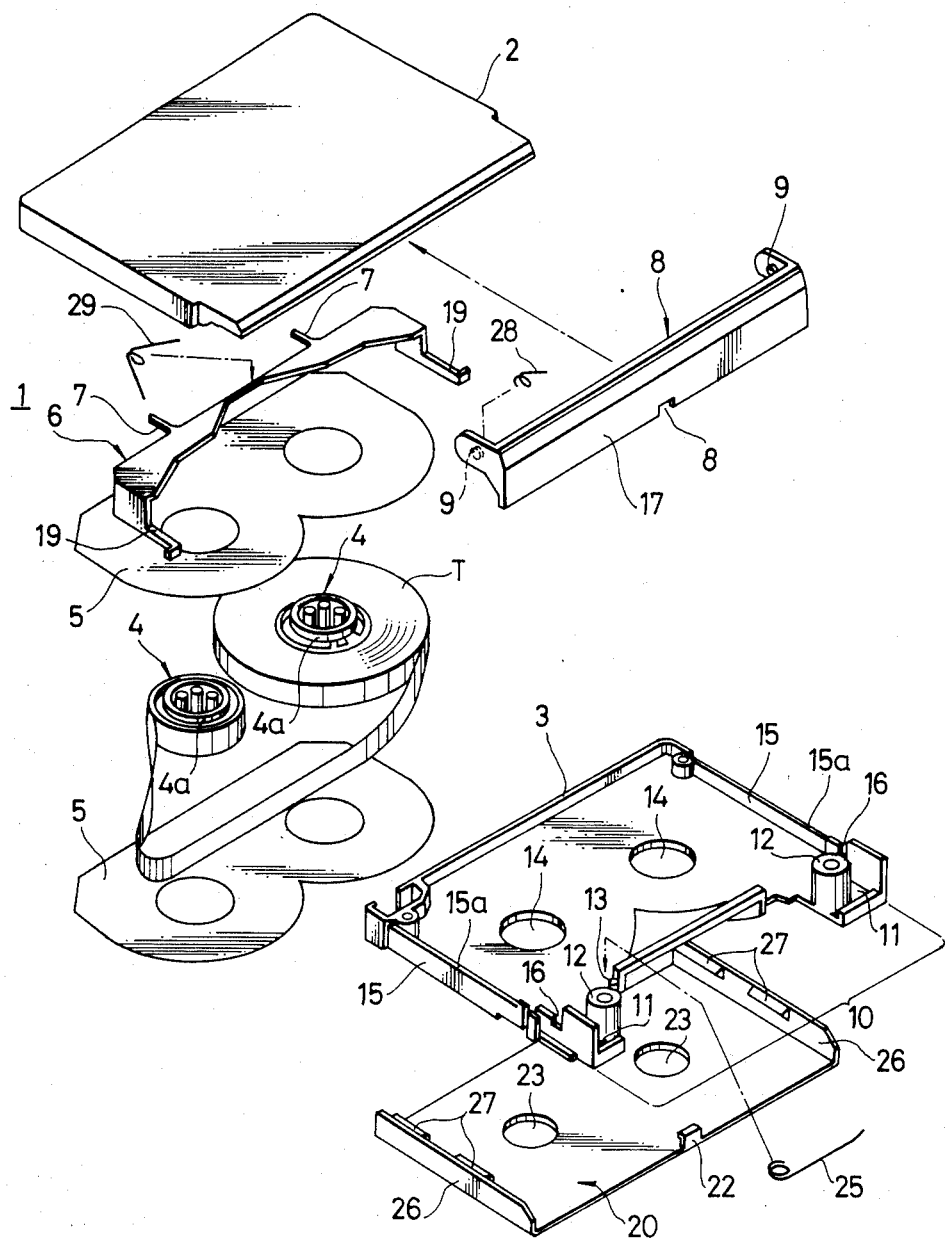
FIG. 1 is an exploded perspective view showing a preferred embodiment of a cassette of the invention.

FIG. 1 shows a magnetic tape cassette the same as or smaller in size than a conventional compact audio cassette. The cassette 1 includes a cassette case composed of upper and lower half cases 2 and 3. The cassette also includes a pair of hubs 4 on which a magnetic tape T is wound, friction sheets 5 for allowing the hubs 4 to smoothly rotate, and a locking member 6 for preventing unwanted rotation of the hubs 4. The cassette further includes a guard panel 8 used to close the front part of an opening 10 formed in the front wall of the cassette case, and a slide guide 20 which closes the lower part of the opening 10.

The hubs 4 have peripheral edges 4a which protrude coaxially with their tape winding walls so that they can engage with engaging parts 7 of the locking member 6.

The guard panel 8 is substantially U shaped in horizontal section, similar to a conventional video tape cassette. Its right and left end pieces have respective rotary supporting shafts 9 which protrude towards each other. In assembling the cassette, the rotary supporting shafts 9 of the guard panel 8 are rotatably engaged with holes 16 formed when the upper and lower half cases 2 and 3 are joined together, or holes (not shown) formed in one of the upper and lower half cases 2 and 3. The guard panel 8 is urged by spring 28 to close the opening 10.

The guard panel 8 has a cut 18 at the center of the lower edge of its front wall 17. The cut forms an index for correctly loading the magnetic tape cassette 1 in a magnetic tape recording and reproducing device. That is, when an erroneous-insertion-preventing protrusion, provided in the cassette loading section of the recording and reproducing device, meets the cut 18, the magnetic tape cassette can be correctly loaded in the recording and reproducing device.

As in the conventional video tape cassette, the lower half case 3 has a pair of reel shaft inserting holes 14 in correspondence to the hubs 4, and has tape drawing openings 11 at both ends of the aforementioned opening 10 through which the magnetic tape T can be pulled out of the cassette. The cassette bottom is formed so that the part thereof between the tape drawing openings 11 is recessed towards the rear end of the cassette. In other words, it is so formed that, when the magnetic tape cassette 1 is loaded in the magnetic recording and reproducing device, the tape drawing member of the latter can pass into the cassette from below.

Steps 15a are formed on the upper edges of the side walls 15 of the lower half case 3 so that slits extending along the side walls are formed when the cassette is assembled.

The slide guard 20 is substantially plate shaped. The slide guard is bent at right angles to provide side pieces 26 at both ends which extend along the respective cassette case side walls 15. That is, the slide guard is substantially U shaped in vertical section. The upper edge of each of the side pieces 26 is slightly extended inwardly of the cassette case to form two overhangs 27. Furthermore, through-holes 23 are formed in the slide guide 20 which are in alignment with the reel shaft inserting holes 14, and an engaging protrusion 22 is formed on the inner surface of the slide guide 20. The engaging protrusion 22 is engaged with a slide guide spring 25 which urges the slide guide 20 towards the front end of the cassette.

Figure 2:
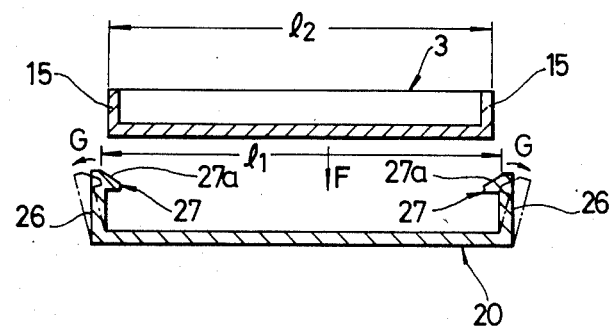
FIG. 2 is a sectional view showing essential components of the cassette of FIG. 1.
Figure 3:
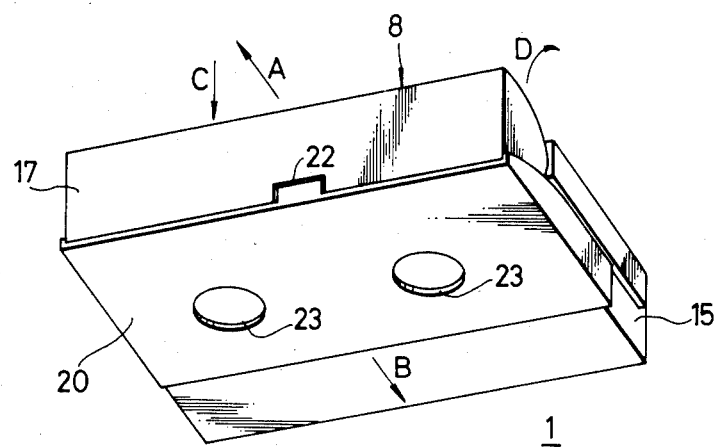
FIG. 3 is a perspective view showing a magnetic tape cassette obtained by assembling various components shown in FIG. 1.

The upper surfaces 27a of the overhangs 27 are tapered surfaces which are inclined inwardly of the slide guard 20, as shown in FIG. 2. The tapered upper surfaces 27a are designed so that the distances $l_1$ between their upper end parts is larger than the distance $l_2$ between the parts of the lower half case 3 on which the slide guard 20 is mounted. The inclination of the upper surfaces 27 is not particularly limited, and should be determined by suitably taking various conditions such as the material and the wall thickness of the slide guard 20 into account.

The front part of the upper half case 2 is designed so that, as in a conventional video tape cassette, when it is combined with the lower half case, the aforementioned tape drawing openings 11 are formed. An arrangement (not shown) for regulating the rotational positions of the hubs is provided on the upper surface of the upper half case 2.

The magnetic tape cassette 1 is assembled as follows: First, the slide guard 20 is mounted on the outer surface of the lower half case 3. In this case, the overhangs 27 move inside the cassette from above the upper edges of the steps 15a of the lower half case 3. In other words, the lower half case 3 is pushed into the slide guard from above, as shown in FIG. 2, so that the side pieces 26 of the slide guard 20 are flexed outwardly (in the directions of the arrows G) and the overhangs 27 move inside the cassette.

One end of the slide guard spring 25 is fastened to a locking pin 13 on the lower half case 3 while the other end is engaged with the engaged protrusion 22 so that the slide guard 20, being urged towards the front end of the cassette, is made slidable in the longitudinal direction of the side pieces 26. Thereafter, the hubs 4 on which the magnetic tape T has been wound are placed on the friction sheet 5 over the inner surfaces of the lower half case in such a manner that they are in alignment with respective ones of the reel shaft inserting holes 14. Then, the magnetic tape T is partially pulled out of the cassette through the tape drawing openings 11 and is laid over right and left tape guides 12. In this condition, another friction sheet 5 is placed over the hubs, and then the locking member 6 is arranged on the friction sheet 5. In this case, the locking member 6 is arranged so that it, being urged towards the rear end of the cassette by a locking member spring 29, can slide back and forth. When the upper half case 2 is combined with the lower half case 3, the rotary supporting shafts 9 of the guard panel 8 are rotatably engaged with respective ones of the holes 16, and the guard panel 8 is urged by the guard panel spring 28 so as to close the opening.

After the upper half case 2 is placed on the lower half case 3 as described above, the cases 2 and 3 are jointed tightly with screws or the like.

When the magnetic tape cassette 1 is in storage (not in use), the guard panel 8 and the slide guard 20 close the opening 10, and the peripheral edges 4a of the hubs 4 are abutted against the engaging parts 7 of the locking member 6 so that rotation of the hubs 4 is prevented.

The upper and lower half cases 2 and 3, the guard panel 8, and the locking member 6 may be made of a plastic resin such as polyacetal resin, ABS resin or PS resin, as in a conventional cassette. The slide guard 20 may be made of a metal such as stainless steel. However, it is preferable that it be made of plastic resin due to the lower manufacturing cost.

The magnetic tape T may be a ferromagnetic iron oxide or chromium dioxide tape, but it is preferable to employ a magnetic tape such as metal tape or vacuum deposited tape which is suitable for high density recording and reproducing operations.

When the magnetic tape cassette 1 is loaded in or unloaded from the magnetic tape recording and reproducing device, its various parts operate as follows:

In order to load the magnetic tape cassette 1 into the cassette inserting section of the recording and reproducing device, the cassette 1 is inserted with its opening 10 held forwardly (in the direction of the arrow A in FIG. 2). In this operation, the engaging protrusion 22 of the slide guard 20 is abutted against the erroneous-inserting-preventing protrusion in the cassette inserting section so that the slide guard is slid towards the rear end of the cassette (in the direction of the arrow B). As a result, the lower part of the opening 10 is opened, while the through-holes 23 are aligned with the respective reel shaft inserting holes 14 so as to be ready for receiving the hub driving reel shafts.

Thereafter, the magnetic tape cassette 1 is moved in a direction perpendicular to the direction of insertion, namely, downwardly (in the direction of the arrow C). In this operation, the lower edge of the guard panel is abutted against the guard panel opening device provided at the inner part of the cassette inserting section so that the guard panel is swung upwardly (in the direction of the arrow D) with the rotary supporting shafts 9 acting as a rotational axis.

As the guard panel 8 is opened, the right and left end pieces of the guard panel 8 engage the end portions of the right and left extended pieces 19 of the locking member 6 to slide the latter towards the front end of the cassette. As a result, the hubs 4 are disengaged from the locking parts 7 of the locking member 6 so that the hubs 4 can be rotated.

When the loading of the magnetic tape cassette 1 has been accomplished by inserting it and by moving it downwardly, and the opening 10 has been completely opened by sliding the slide guard 20 and by swinging the guard panel 8, the peripheral edges 4a are disengaged from the engaging parts 7. As a result, the magentic tape T can be partially pulled out of the cassette, while the hubs 4 can be turned. Then, recording and reproducing operations can be carried out as desired.

In unloading the magnetic tape cassette 1 from the magnetic tape recording and reproducing device, the above-described operations are carried out in the reverse order. First, the guard panel 8 is disengaged from the guard panel opening 10 with the aid of the guard panel spring 27. As the magnetic tape cassette 1 is pulled out, the slide guard 20 is disengaged from the erroneous-insertion-preventing protrusion so that it is slid towards the front end of the cassette with the aid of the slide guard spring 25. As a result, the opening 10 is completely closed.

As the guard panel 8 swings to close the opening 10, the right and left end piece of the guard panel 8 are disengaged from the ends of the extended pieces 19 of the locking member 6. As a result, the locking member 6 is slid towards the rear end of the cassette by the locking spring 29 so that the locking parts 7 are engaged with the peripheral edges 4a, thus locking the hubs 4. As the slide guard 20 slides to close the lower part of the opening 10, the reel shaft inserting holes 14, being displaced from the through-holes 23, are closed.

In the above-described embodiment, two overhangs 27 are provided on each side piece 26 of the slide guard 20. However, it should be noted that the invention is not limited thereto or thereby. That is, the two overhangs may be connected together so that one longer overhang is provided on each side piece 26, or more than two overhangs may be formed on each of the side pieces 26.

In the above-described embodiment, the engaging protrusion 22 to which the slide guard spring 25 is fastened is utilized to move the slide guard 20 towards the rear end of the cassette. However, it should be noted that the invention is not limited thereto or thereby. For instance, the cassette may be modified by forming protrusions at both ends of the front part of the slide guard 20 and cuts for receiving the protrusions in the guard panel 8 so that the erroneous-insertion-preventing protrusions engaging with the protrusions of the slide guard 20 are utilized to move the latter.

As is apparent from the above description, when the magnetic tape cassette of the invention is in storage (not in use), the opening 10 is maintained completely closed by the guard panel 8 and the slide guard 20, and the reel shaft inserting holes 14 are also closed by the slide guard 20. Therefore, the magnetic tape T in the cassette is satisfactorily protected from damage and dust. Accordingly, the cassette is considerably effective in maintaining the recording and reproducing characteristics of the magnetic tape.

In the magnetic tape cassette of the invention, with the overhangs 27 having the above-described upper surfaces 27a, the slide guard 20 can be mounted on the lower half case 3 merely by pushing the lower half case 3 into the slide guard 20 from above. This greatly improves the case of cassette assembling efficiency. Furthermore in the above-described embodiment, a plurality of overhangs 27 are formed on each of the side pieces 26 of the slide guard 20, and therefore each side piece is not so greatly reinforced with the overhangs. Accordingly, when the lower half case 3 is pushed into the slide guard 20, the side pieces 26 can be readily flexed outwardly; that is, the slide guard 20 can be readily combined with the lower half case 3.

Further, it should be noted that the technical concept of the invention is applicable to conventional video tape cassettes and other magnetic tape cassettes and to cassettes of any size.

We claim:

1. In a magnetic tape cassette comprising fixedly coupled lower and upper half cases of inverted U-shape transverse cross section and U-shape transverse cross section, respectively, said upper half case including a top wall and integral side walls, said lower half case including a bottom wall and integral side walls, said fixedly coupled upper and lower half cases including a pair of hubs on which a magnetic tape is wound, said cassette having a front, an opening within said front of said cassette and extending into said lower half case bottom wall, through which opening said magnetic tape can be pulled out of said cassette, a guard panel movably mounted on said cassette and adapted to close the part of the opening within the front of the cassette, a slide guard adapted to close the part of said opening within said bottom wall, and a locking member for locking said hubs, the improvement wherein said slide guard comprises a plate member substantially U-shaped in vertical transverse cross section and having resilient side pieces at both ends which extend along at least the side walls of the lower half case for slidable movement forwardly and backwardly of said cassette, said slide guard being urged towards the front of said cassette, at least one overhang being formed along an upper edge of each side piece of said slide guard, said overhangs projecting inwardly towards each other, at least one of said half cases defining parallel longitudinal slits within opposite side walls, said overhangs being positioned within respective slits, said overhangs having upper edges which are inclined downwardly and inwardly of the slide guard, said upper edges having upper ends, and wherein the distance between the upper ends of the inclined edges is larger than the distance between the integral side walls of the lower case half whereby, the slide guard may be mounted to the lower half case upon contact of the bottom wall of the lower half case at said side wall with the inclined upper edges of said overhang, thereby flexing said side pieces outwardly away from each other to permit said side pieces to move along the exterior of the side walls of said cassette lower half case whereupon said overhangs are snap fitted into respective slits to complete the mounting of the slide guard to said fixedly coupled upper and lower half casings to facilitate forward and rearward sliding of said slide guard on said magnetic tape cassette via the engagement of the overhangs with the respective slits.

2. The magnetic tape cassette as claimed in claim 1, wherein a plurality of said overhangs are formed along upper edges of each of said side pieces of said slide guard.

* * * * *